United States Patent [19]
Urbansky

[11] Patent Number: 5,550,876
[45] Date of Patent: Aug. 27, 1996

[54] MEASURING DEVICE FOR A SYNCHRONOUS TRANSMISSION SYSTEM

[75] Inventor: Ralph Urbansky, Schwaig bei Nürnberg, Germany

[73] Assignee: Lucent Technologies Inc., Murray Hill, N.J.

[21] Appl. No.: 296,210

[22] Filed: Aug. 25, 1994

[30] Foreign Application Priority Data

Aug. 28, 1993 [DE] Germany .................... 43 29 041.8

[51] Int. Cl.⁶ .................................................. H04L 7/00
[52] U.S. Cl. ............................. 375/371; 370/105.3
[58] Field of Search ................. 375/10, 109, 371; 370/13, 14, 15, 105.3; 324/782; 455/67.7, 115

[56] References Cited

U.S. PATENT DOCUMENTS

| | | | |
|---|---|---|---|
| 3,875,500 | 4/1975 | Fletcher et al. | 375/10 |
| 5,086,438 | 2/1992 | Sugata et al. | 375/114 |
| 5,148,430 | 9/1992 | Kuranaga et al. | 375/109 |
| 5,195,088 | 3/1993 | Urbansky | 370/84 |
| 5,201,061 | 4/1993 | Goldberg et al. | 455/67.1 |
| 5,263,056 | 11/1993 | Urbansky | 375/118 |
| 5,280,629 | 1/1994 | Lo Galbo et al. | 455/67.6 |
| 5,327,430 | 7/1994 | Urbansky | 370/84 |
| 5,331,671 | 7/1994 | Urbansky | 375/118 |
| 5,343,476 | 8/1994 | Urbansky | 375/118 |

FOREIGN PATENT DOCUMENTS 0435384 7/1991 European Pat. Off. .
0443029 8/1991 European Pat. Off. .

OTHER PUBLICATIONS

"Messaufgaben an SDH-Uvertragungssystemen" Roland Kiefer, NTZ Nachrichten Technische Zeitschrift, Bd. 46, Nr. 2, Feb. 1993.

"2,5-Gbit/s-Leitungsausrustung im Projekt Berlin V", by Marlow et al, NTZ Bd. 44 (1991) Heft 11, pp. 782–788.

Primary Examiner—Stephen Chin
Assistant Examiner—T. Ghebretinsae
Attorney, Agent, or Firm—Christopher N. Malvone

[57] ABSTRACT

The invention relates to a measuring device for measuring the phase deviation of at least a subordinate transport unit of a synchronous signal transmitted through a synchronous transmission system. The measuring device comprises a transmitter unit for forming the synchronous signal to be transmitted, a first desynchronizer for splitting up the synchronous signal and for detecting at least a given byte of the subordinate transport unit, a second desynchronizer for splitting up the received synchronous signal which has passed through the transmission system and for detecting at least the given byte in the received synchronous signal, and an evaluation unit for calculating the phase deviation from the moments of detection of at least the given byte in the transmitted and the received synchronous signals.

4 Claims, 4 Drawing Sheets

MEASURING DEVICE FOR A SYNCHRONOUS TRANSMISSION SYSTEM

BACKGROUND OF THE INVENTION

1. Field of the Invention

The invention relates to a measuring device for measuring the phase deviation of at least one subordinate transport unit of a synchronous signal transmitted by means of a synchronous transmission system.

2. Description of the Related Art

In a synchronous transmission system, which may be a system according to the synchronous digital hierarchy or the American SONET system (Synchronous Optical Network), it is possible to join together, split up, branch off, feed in, or bypass signal streams, as desired. For example, the plesiochronous payload signal streams coming in into a network junction of the synchronous digital hierarchy (in Europe: 2.048 Mbit/s, 34.368 Mbit/s and 139.264 Mbit/s) may be so prepared by mapping that they are always dispatched on their transmission path in a unified, 125 µs long synchronous transport frame (STM-1 frame) as STM-1 signals with a bitrate of 155.52 Mbit/s. Such a network junction is also capable of receiving and processing STM-N signals (N=4, 16, . . .) arising through multiplexing of STM-1 signals.

The STM-1 signal is structured into frames and comprises besides the actual payload data of the signal also control information and stop data. An STM-1 frame consists of 270 columns and 9 lines (270 bytes per line). The lines 1 to 3 and 5 to 9, in columns 1 to 9 each time, contain the "Section Overhead" (SOH) for control and error recognition information, while the remaining space (AU payload space) contains signal data, stop data, and further control information.

Several different containers (C-4, C-3, C-2, C-12 and C-11) may be accommodated in the AU payload space. A container is the basic packaging unit for digital payload signals. For example, an administrative unit AU-4 with a container C-4 for a bitrate of 139.264 Mbit/s may be accommodated in an STM-1 frame. Furthermore, three administrative units AU-3 may be accommodated in the STM-1 frame. Of these, for example, one administrative unit AU-3 comprises a container C-3 for a bitrate of 44.736 Mbit/s. The second administrative unit AU-3 may contain, for example, seven tributary unit groups TUG-2 each with a container C-2 for a bitrate of 6.312 Mbit/s. In the third administrative unit AU-3, furthermore, seven TUG-2 each with three containers C-12 for a bitrate of 2.048 Mbit/s may be accommodated. Further transport units (VC-4, VC-3, TU-3, TU-2, TU-12 and TU-11) are formed from the containers through the addition of control information and stop information.

The transmission of a subordinate transport unit, which may be a transport unit of a plesiochronous signal (for example, 2.048 Mbit/s) or a virtual container VC-2, VC-12 or VC-11, via several synchronous digital devices leads to passage timedependent phase shifts between the STM-1 signal formed in a synchronizer with at least one subordinate transport unit and the STM-1 signal with the subordinate transport unit received in a desynchronizer. Furthermore, shifts of transport units dependent on buffer fillings arising from frequency and phase fluctuations, which shifts lead to a change in at least one pointer value of a transport unit and thus also cause stop processes, effect an additional phase shift of the subordinate transport unit. The additional phase shift which, as stated above, is indicated by a change in an AU pointer (in the case of a shift of a VC-3 or VC-4) or a TU pointer (in the case of a shift of a VC-2, VC-12 or VC-11) must be taken into account during the desynchronization.

A measuring device for a SDH system is known, for example, from the article "2,5-GBit/s-Leitungsausrüstung im Projekt Berlin V" (2.5-Gbit/s Line Equipment in the Berlin V Project), ntz, vol. 44, 1991, no. 11, pp. 782–788. The block diagram of this measuring device is shown in FIG. 7 of the article. An SDH analyser (transmitter) forms an STM-1 signal which is supplied to an SDH system. In the SDH system, an STM-16 signal is formed from several STM-1 signals by a multiplexer and guided towards an optical receiver of the SDH system via an optical transmitter and a light waveguide. The received STM-1 signal is supplied to the receiver unit of the SDH analyser from the optical receiver through a demultiplexer. In addition, a frequency counter and a personal computer are present, by means of which the phase deviation between the transmitted and received STM-1 signal is to be ascertained. The STM-1 signal supplied by the SDH analyser is written into the multiplexer of the SDH system by means of a write clock signal with a first frequency. The STM-1 signal is read out from the multiplexer by means of a read clock signal with a second frequency. The conditions are exactly the reverse in the demultiplexer. The read clock signal of the multiplexer is here used as the write clock signal, and the write clock signal of the multiplexer is used as the read clock signal. It is possible with this measuring device only to ascertain the phase deviation of the virtual container VC-4 in the STM-1 signal after passage through the SDH system. A phase deviation of a subordinate transport unit passing through the SDH system cannot be measured.

SUMMARY OF THE INVENTION

The invention accordingly has for its object to provide a measuring device by means of which the phase deviation of subordinate transport units can be determined.

In a measuring device for measuring the phase deviation of at least one subordinate transport unit of a synchronous signal transmitted via a synchronous transmission system, this object is achieved by means of the following characteristics: the measuring device comprises a transmission unit for forming the synchronous signal to be transmitted, a first desynchronizer for separating the synchronous signal and for detecting at least one given byte of the subordinate transport unit, a second desynchronizer for separating the received synchronous signal passing through the transmission system and for detecting at least said given byte in the received synchronous signal, and an evaluation unit for calculating the phase deviation from the moments of detection of at least said given byte in the transmitted and the received synchronous signal.

The measuring device according to the invention measures the phase deviation between the transport unit of a synchronous signal and the transport unit of the received synchronous signal which has passed through a synchronous transmission system. The phase deviation in this case is composed of a shift depending on the time of passage and a shift depending on the degree of fullness of a buffer following from frequency and phase fluctuations. In devices of the synchronous transmission system, in fact, clock pulse adaptations are carried out by means of a buffer memory on the basis of frequency and phase fluctuations between a write clock signal derived from the incoming synchronous signal and a locally generated read clock signal.

The measurement of the phase deviation of, for example, a transport unit VC-12 in an STM-1 signal could be carried out as follows:

first he starting moment of the transport unit VC-12 in an STM-1 frame is determined without this transport unit having previously been captured in a first desynchronizer. After passing through the synchronous transmission system, the start of the transport unit VC-12 is measured in the received STM-1 frame (pattern recognition in STM-1 signal). The measured time of passage then follows from the formation of the difference, which again can be convened into a phase deviation. In the synchronous transmission system, a shift of a higher-order transport unit (VC-4 or VC-3) containing the subordinate transport unit VC-12, and thus leading to a change in the AU pointer value, may lead to an incorrectly measured phase deviation. This incorrectly measured phase deviation is caused by the shift of the bytes of the section overhead (SOH) relative to the transport unit VC-12.

The measuring device according to the invention prevents such an incorrect measurement in that only bytes separated in the first and second desynchronizer (for example data voids caused by stop processes) of a subordinate transport unit are utilized in an evaluation unit for the determination of the phase deviation.

An embodiment of the first and second desynchronizer comprises at least a buffer memory for intermediate storage of data of a subordinate transport unit contained in the supplied synchronous signal, a write address generator for receiving a write clock signal obtained from the supplied synchronous signal and for controlling the process of writing the data into the buffer memory, a control device for forming a control signal for the write address generator from the supplied synchronous signal, a read address generator for controlling the process of reading the data from the buffer memory, a subtraction device for forming difference values from the addresses from the write and read address generators, a circuit for generating from the difference values a read clock signal which is supplied to the read address generator, and a detection circuit for recognizing the given byte from the bytes read from the buffer memory or from the bytes of the subordinate transport unit to be written into the buffer memory.

The read clock signal is thus generated by a circuit which comprises a local oscillator, a controller and an adjustment member. The local oscillator may be, for example, the same one which is also used for the generation of the synchronous signal in the transmitter unit. A write clock signal is derived from the synchronous signal supplied to the desynchronizer. The bytes of a subordinate transport unit read from the buffer memory are applied to a detection circuit which determines the given byte, for example, through pattern recognition. Certain bytes may appear in a certain byte sequence in this case. This pattern recognition may also be carried out before the process of writing into the buffer memory. In that case, only those bytes which are necessary for the pattern recognition are written into the buffer memory. Such a desynchronizer without pattern recognition is known, for example, from EP-A2-0 435 384 in which a transport unit for a synchronous plesiochronous signal is obtained.

An embodiment for the evaluation unit comprises a counter. Here the first desynchronizer is arranged so as to supply a start signal to the counter after the detection of the given byte in the transmitted synchronous signal, and the second desynchronizer is arranged so as to supply a stop signal to the counter after the detection of the given byte in the received synchronous signal.

The measuring device may be used for measuring the phase deviation of subordinate transport units of an STM-1 signal of the synchronous digital hierarchy (SDH). A subordinate transport unit here is a virtual container VC-2, VC-12 or VC-11, or a transport unit of a plesiochronous signal transported in a VC-2, VC-12 or VC-11.

BRIEF DESCRIPTION OF THE DRAWINGS

An embodiment of the invention will be explained in more detail below with reference to the Figures, in which.

DETAILED DESCRIPTION OF THE PREFERRED EMBODIMENT

It may be necessary for judging the operation of a synchronous transmission system (for example, transmission system according to the synchronous digital hierarchy) to measure the phase deviation between a subordinate transport unit supplied to the transmission system and the received subordinate transport unit after it has passed through the transmission system. Such a subordinate transport unit may be, for example, a virtual container VC-12 which is transported in an STM-1 signal of the synchronous digital hierarchy.

Figure 1:
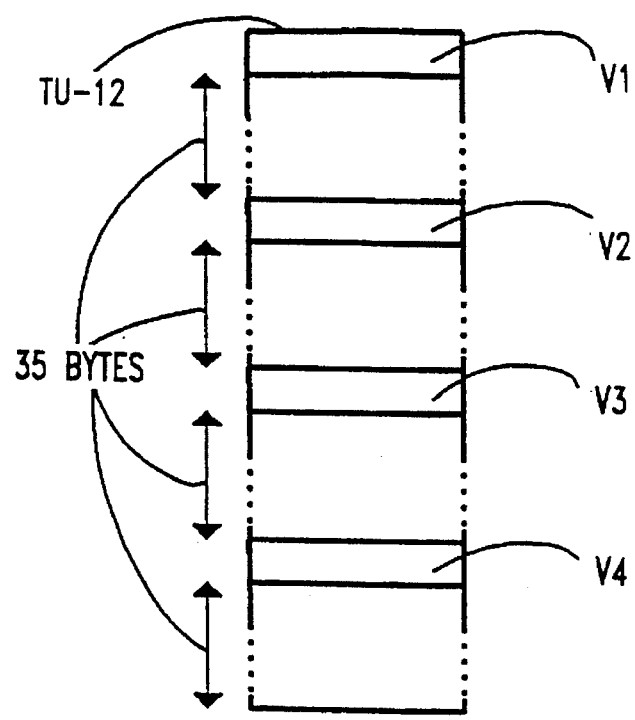
FIG. 1 is a diagram of a virtual container VC-12.

FIG. 1 diagrammatically shows the composition of a TU-12 which contains a VC-12. The latter contains four V-bytes (V1 to V4) separated each time by 35 data bytes. The pointer value is contained in the bytes V1 and V2 and indicates the start of a VC-12 in the TU-12. The start of a VC-12 in a TU-12 is characterized by the V5-byte (not shown). The V3-byte renders it possible to stop negatively. A TU-12 is transported in four consecutive STM-1 frames. The duration for the transmission of a TU-12 accordingly is 500 μs.

Figure 2:
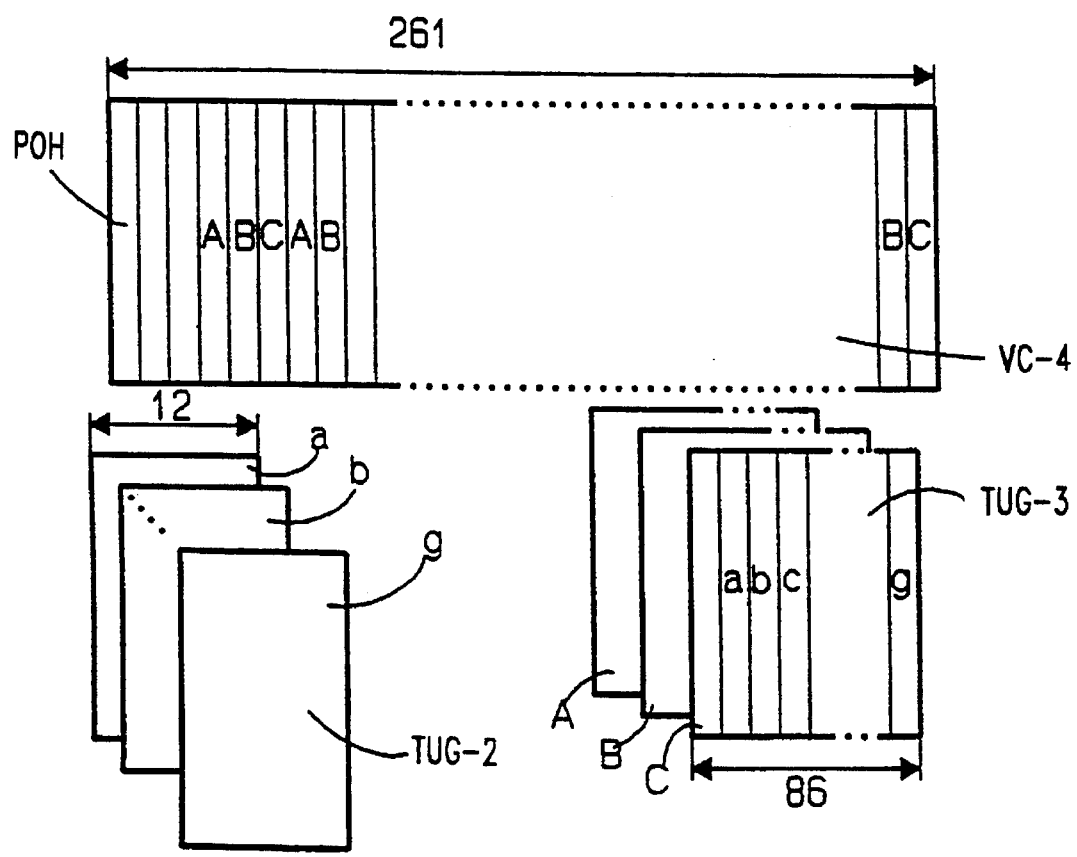
FIG. 2 is a diagram of a virtual container VC-4 in which several VC-12 have been accommodated.

The bytes of a TU-12 are accommodated column by column in a TUG-2. The four columns (of nine bytes each) of three TU-12 are joined together alternately in a TUG-2, and seven TUG-2 are joined together into a VC-3 or TUG-3. This interlocking is shown in FIG. 2. Each TUG-2 comprises twelve columns (each column comprising 9 bytes) which are also alternately accommodated in a TUG-3 or VC-3. A TUG-3, which comprises 86 columns (of nine bytes each), has fixed stop bytes in the first column and bytes of the transport unit TU-12 in the remaining columns.

As is further shown in FIG. 2, the bytes of three TUG-3 are inserted into a VC-4. The VC-4 contains in the first column a path overhead (POH), and fixed stop bytes in the two following columns. Starting from column 4, columns of the three TUG-3 are alternately inserted.

Figure 3:
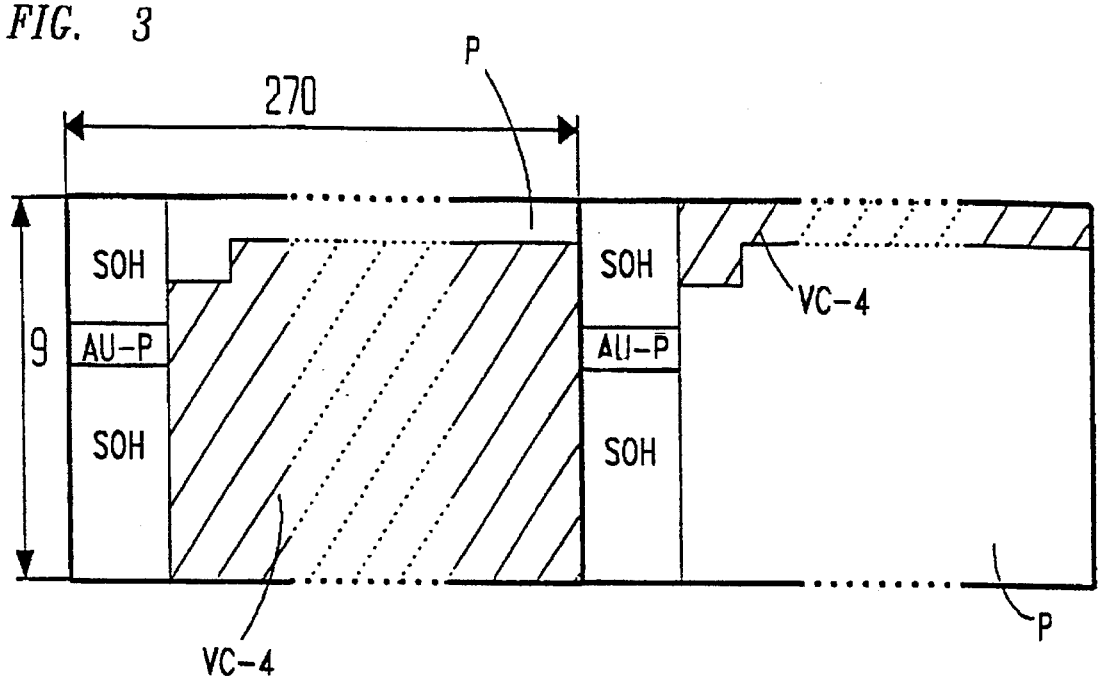
FIG. 3 shows two consecutive STM-1 frames with a VC-4 depicted diagrammatically.

The insertion of a VC-4 into two consecutive STM-1 frames is depicted in FIG. 3. An STM-1 frame comprises 270 columns and 9 lines (270 bytes per line). The section overhead (SOH) is accommodated in the first nine columns in lines 1 to 3 and 5 to 9, and the AU pointer (AU-P) is accommodated in line 4. In the remaining space (AU payload space=P), in columns 10 to 270, payload data, stop bytes, and further bytes for control information are inserted. The AU pointer AU-P contains the information about the first byte of a virtual container VC-4 or VC-3, as applicable, stop information and further control data.

The STM-1 signal is supplied through a transmission system of the synchronous digital hierarchy which comprises, for example, several digital devices. In such devices, adaptation processes take place because of frequency and phase fluctuations between a write clock signal derived from a received signal and a locally generated read clock signal from a buffer memory into which the incoming data are written and intermediately stored. In this case, for example, the virtual container VC-4 (higher-order transport unit) may also be shifted. This shift in the VC-4 causes a change in the AU pointer value, and a stop process takes place. A clock pulse correction may also be carried out in a subsequent device of the transmission system. If a shift of the VC-12 is caused thereby, and thus a change in the TU-12 pointer value, then a stop process will be the result in the TU-12 (clock adaptation with TU-12 pointer bytes).

It has been found that phase shifts caused by clock pulse shifts between the transmitted and received signals are usually not measured correctly when the relevant bytes of a subordinate transport unit (for example, VC-12) in the STM-1 frame are used for the phase measurement.

Figure 4:
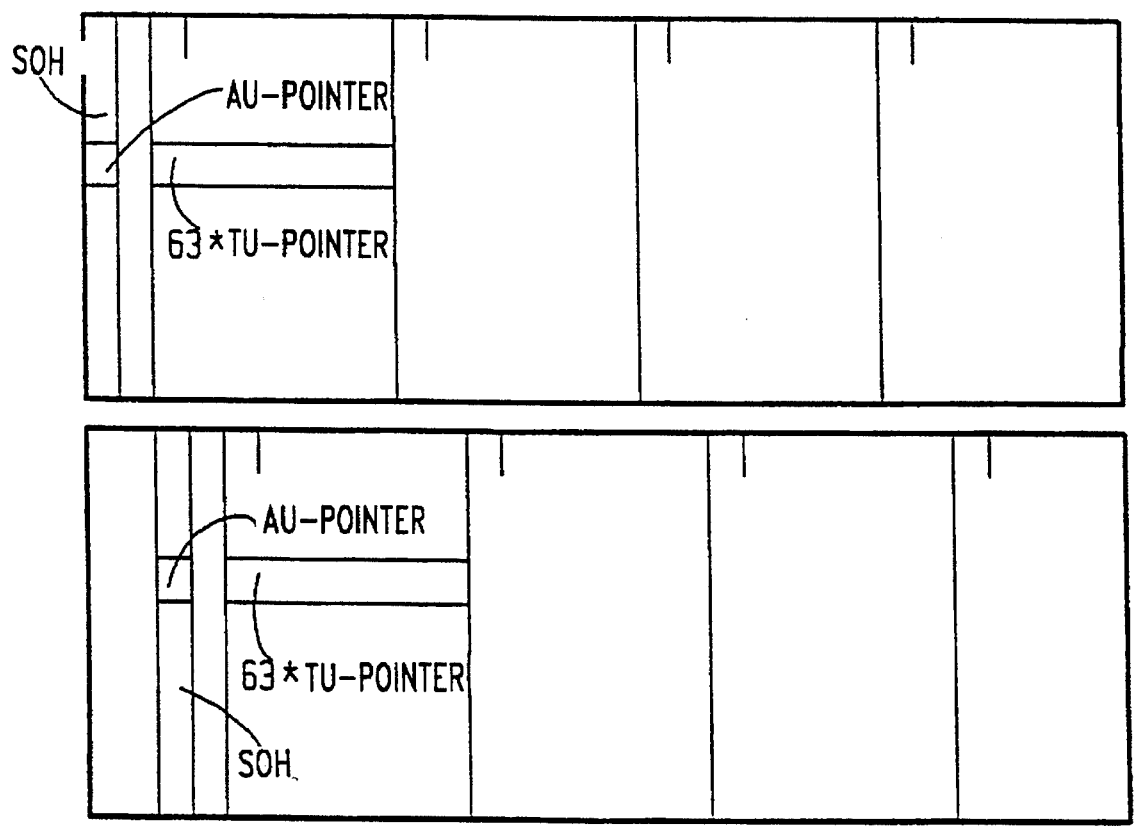
FIG. 4 shows two STM-1 frames diagrammatically before and after passing through a synchronous transmission system.
Figure 5:
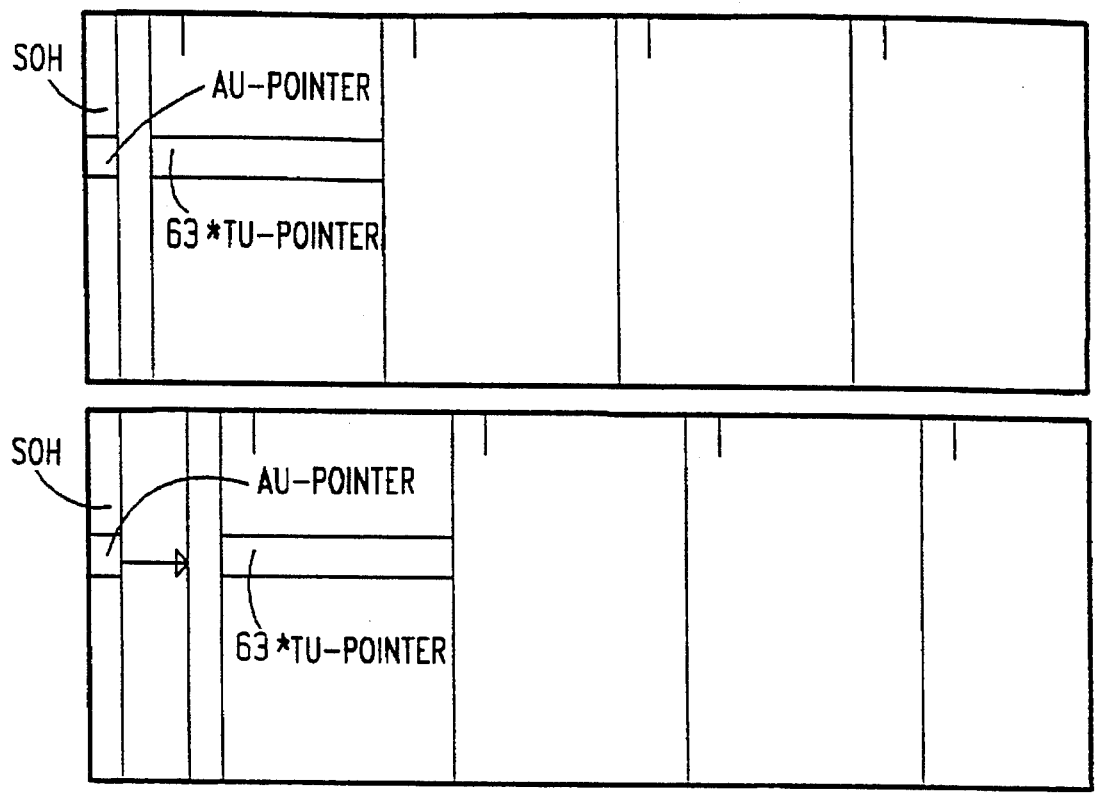
FIG. 5 shows two further diagrammatically depicted STM-1 frames before and after passing through a synchronous transmission system.

This may be clarified further with reference to FIGS. 4 and 5. In these Figures, a transmitted STM-1 frame is pictured in the upper part, containing a total of 63*VC-12 in one VC-4. The first, second, third and fourth column of the VC-12 are mutually separated by vertical lines. An example of a position of TU-pointer bytes (TU-Pointer) is also shown. An individual byte of a VC-12 is indicated with a short line each time. The STM-1 frame depicted in the lower parts of the relevant Figures is one which has passed through the synchronous transmission system.

The frame supplied by the transmission system according to FIG. 4 only shows a phase shift of 18 STM-1 bytes for 2430 STM-1 bytes of the STM-1 frame (frame period: 125 μs) caused by passage time shifts:

$$\frac{18 \text{ Bytes}_{STM-1} * 125 \text{ μS}}{2430 \text{ bYTES}_{STM-1}} \approx 0.93 \text{ μs}$$

The transmission system here carries out an averaging operation on the degree of filling of the buffer memory over the time duration in the stop decision circuit(s) of the transmission system (cf. e.g. the transmission system described in EP-A2-0 503 732). If the phase shift is related to the VC-12 bytes (35 bytes per STM-1 frame), this will result in an average phase shift of:

$$\frac{0.26 \text{ Bytes}_{VC-12} * 125 \text{ μs}}{35 \text{ Bytes}_{VC-12}} \approx 0.93 \text{ μs}$$

with $$\frac{35 \text{ Bytes}_{VC-12} * 18 \text{ Bytes}_{STM-1}}{2430 \text{ Bytes}_{STM-1}} \approx 0.26 \text{ Bytes}_{VC-12}$$

The 0.26 bytes$_{VC-12}$ represent the average phase shift, i.e. the degree of filling of the buffer for the relevant transport unit VC-12. The correct phase shift is measured in this example.

In FIG. 5, the STM-1 signal received in the desynchronizer has the AU-4 pointer value 6 (18-byte shift). The average phase shift related to the VC-12 bytes (cf. the above calculation) is ≈0.26 VC-12 bytes (≈0.93 μs). By taking into account the VC-4 bytes, however, the correct average phase shift is obtained. This amounts to 18 VC-4 bytes.

$$\frac{18 \text{ Bytes}_{VC-4} * 125 \text{ μs}}{2349 \text{ Bytes}_{VC-4}} \approx 0.96 \text{ μs}$$

In this example, the phase shift is not correctly determined in the phase measurement. The correct phase shift may be measured by means of the measuring device depicted in FIG. 6.

Figure 6:
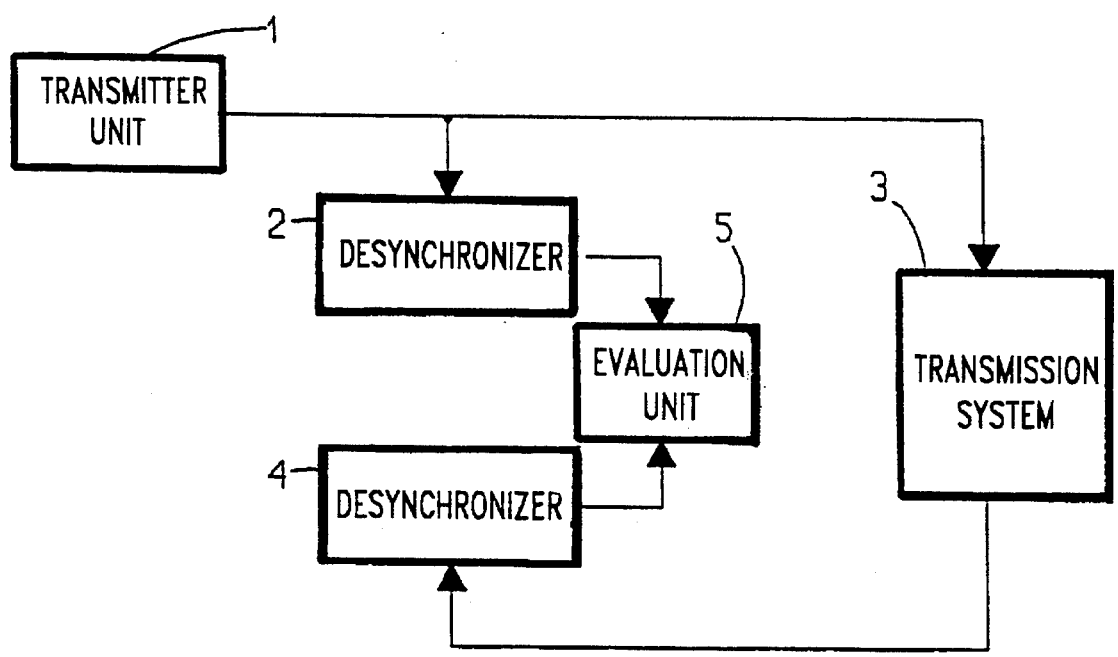
FIG. 6 is a block diagram of a measuring device.

The measuring device of FIG. 6 comprises a transmitter unit 1 which generates an STM-1 signal with, for example, a total of 63 VC-12, as shown in FIGS. 1 to 3. An analyser from the measuring device may be used, for example, as the transmitter unit, as disclosed in the article "2,4-Gbit/s-Leitungsausrüstung im Projekt Berlin V", ntz, vol. 44, 1991, no. 11, pp. 782–788. The STM-1 signal is supplied to a first desynchronizer 2 and to a transmission system 3 of the synchronous digital hierarchy. The transmission system 3 may comprise, for example, a digital synchronous device with a clock pulse adaptation in which a frequency and/or phase fluctuation is compensated by shifting of the VC-4. The STM-1 signal supplied by the transmission system 3 is applied to a second desynchronizer 4 which, similar to the first desynchronizer 2, derives the bytes of a VC-12 from the STM-1 signal through separation of the STM-1 signal. When a given byte of the subordinate transport unit VC-12 occurs, the first desynchronizer 2 supplies a start signal and the second desynchronizer 4 supplies a stop signal to an evaluation unit 5, which comprises a counter (not shown) and an evaluation device (not shown). The counter is supplied with a clock signal by a clock pulse generator (not shown). This clock signal may, for example, also be supplied from the clock signal of the clock pulse generator driving the transmitter unit 1. When the counter in the evaluation unit 5 receives a start signal from the first desynchronizer 2, the counter is started, and it is stopped when it receives a stop signal from the second desynchronizer 4.

Figure 7:
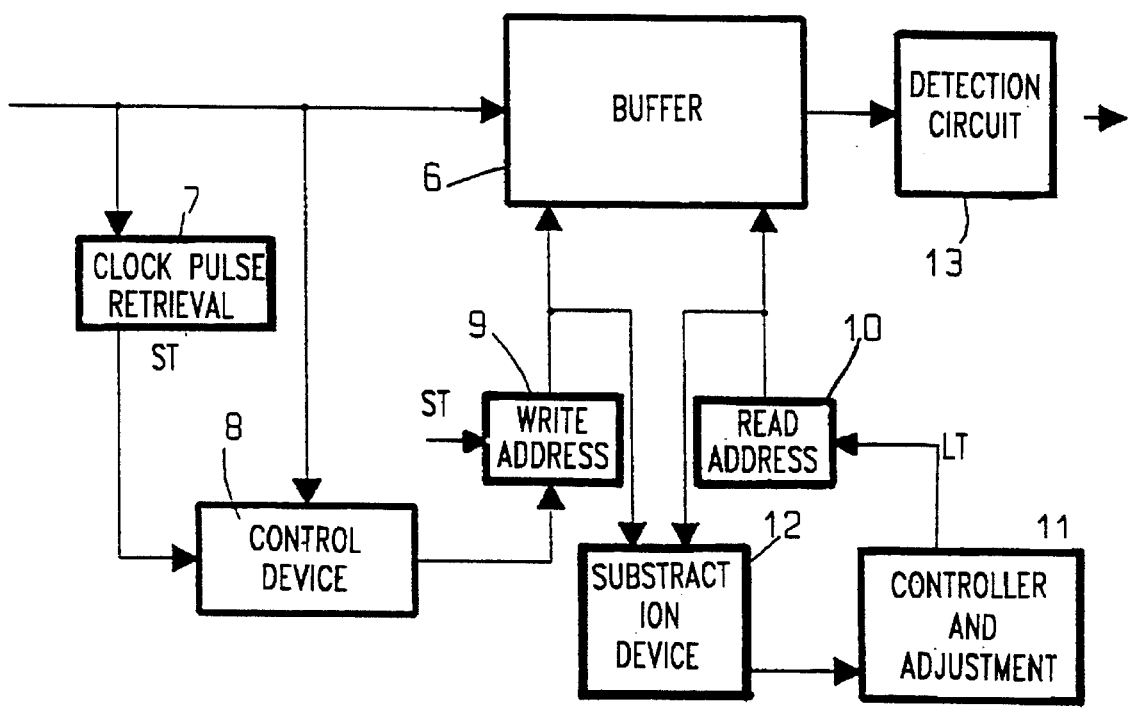
FIG. 7 is a block diagram of a desynchronizer used in the measuring device.

An example of the first and second desynchronizers 2 and 4 is shown in more detail in FIG. 7. A buffer memory 6 receives the bytes of a subordinate transport unit VC-12 transported in an STM-1 signal, these bytes being inserted in a TU-12. The bytes of the TU-12 are transported in the STM-1 signal, as explained above. A clock pulse retrieval circuit 7 derives a write clock signal ST with a frequency of approximately 155.52 MHz from the STM-1 signal. The write clock signal ST is supplied to a control device 8, comprising comparators and counters, and to a write address generator 9. An example of a control device 8 is given in EP-A2-0 435 384. In the control device of the cited European Patent Application, control signals are generated for a counter which serves to write payload data bytes into a VC-4. The control device 8 operates in a similar manner as the control device described in EP-A2-0 435 384 and serves to control the write process of bytes of a VC-12 by means of a control signal.

The read process from the buffer memory 6 is controlled by a read address generator 10 constructed as a counter which receives a read clock signal LT with a frequency of approximately 2.048 MHz from a circuit 11 which serves as a controller and adjustment member. Such a circuit arrangement 11 is also known from EP-A2-0 435 384. Here the read clock signal LT is derived from a clock signal of a local clock pulse generator, for example, present in the circuit 11. This clock signal may alternatively be supplied by the clock pulse generator of the transmitter unit 1. The addresses generated by the write address generator 9 and the read address generator 10 are supplied to a subtraction device 12 which forms a difference value, which is applied to the circuit 11. The bytes read from the buffer memory 6 are supplied to a detection circuit 13 which determines the given byte through pattern recognition. Certain consecutive bytes may exhibit a given pattern here. When such a pattern is recognized, one of these bytes then is the sought given byte. Such a desynchronizer 2 or 4 as described with reference to FIG. 7 supplies a signal serving either as a start signal or as a stop signal to the evaluation unit 5.

The counter position determined in the evaluation unit 5 after receiving the stop signal is passed on to the display unit (not shown), which calculates the phase deviation from the counter value.

I claim:

1. A measuring device for measuring a phase deviation of at least one subordinate transport unit of a synchronous signal, said synchronous signal having at least one subordinate transport unit, said transport unit having at least one byte, the synchronous signal being transmitted by means of a synchronous transmission system, comprising:

a transmission unit for forming the synchronous signal to be transmitted, a first desynchronizer for receiving a transmitted synchronous signal from the transmission unit and separating the bytes of the transmitted synchronous signal and for detecting at least one selected byte of the subordinate transport unit, a second desynchronizer for receiving a received synchronous signal from the synchronous transmission system and separating the received synchronous signal passing through the transmission system and for detecting at least said selected byte in the received synchronous signal, and an evaluation unit for calculating the phase deviation from the moments of detection of at least said selected byte in the transmitted and the received synchronous signal.

2. A measuring device for measuring a phase deviation of at least one subordinate transport unit of a synchronous signal, said synchronous signal having at least one subordinate transport unit, said transport unit having at least one byte, the synchronous signal being transmitted by means of a synchronous transmission system, comprising:

a transmission unit for forming the synchronous signal to be transmitted, a first desynchronizer for receiving a transmitted synchronous signal from the transmission unit and separating the bytes of the transmitted synchronous signal and for detecting at least one selected byte of the subordinate transport unit, a second desynchronizer receiving a received synchronous signal from the synchronous transmission system for separating the received synchronous signal passing through the transmission system and for detecting at least said selected byte in the received synchronous signal, an evaluation unit for calculating the phase deviation from the moments of detection of at least said selected byte in the transmitted and the received synchronous signal, and the first and the second desynchronizer each including at least a buffer memory for intermediate storage of data of the subordinate transport unit contained in the synchronous signal, a write address generator for receiving a write clock signal obtained from the synchronous signal and for controlling the process of writing the data into the buffer memory, a control device for forming a control signal for the write address generator from the synchronous signal, a read address generator for controlling the process of reading the data from the buffer memory, a subtraction device for forming difference values from the addresses of the write and read address generators, a circuit for generating from the difference values a read clock signal which is supplied to the read address generator, and a detection circuit for recognizing the selected byte from the data read from the buffer memory corresponding to the bytes of the subordinate transport unit to be written into the buffer memory.

3. A measuring device as claimed in claim 1, characterized in that the first desynchronizer is arranged so as to supply a start signal to a counter included in the evaluation unit after the detection of the selected byte in the transmitted synchronous signal, and in that the second desynchronizer is arranged so as to supply a stop signal to the counter after the detection of the selected byte in the received synchronous signal.

4. A measuring device for measuring a phase deviation of at least one subordinate transport unit of a synchronous signal, said synchronous signal having at least one subordinate transport unit, said transport unit having at least one byte, the synchronous signal being transmitted by means of a synchronous transmission system, comprising:

a transmission unit for forming the synchronous signal to be transmitted, a first desynchronizer for receiving a transmitted synchronous signal from the transmission and separating the bytes of the transmitted synchronous signal and for detecting at least one selected byte of the subordinate transport unit, a second desynchronizer receiving a received synchronous signal from the synchronous transmission system and separating the received synchronous signal passing through the transmission system and for detecting at least said selected byte in the received synchronous signal, and an evaluation unit for calculating the phase deviation from the moments of detection of at least said selected byte in the transmitted and the received synchronous signal;

the synchronous signal being an STM-1 signal according to the synchronous digital hierarchy (SDH), and in that a subordinate transport unit is a virtual container VC-2, VC-12 or VC-11, or a transport unit of a plesiochronous signal transported in a VC-2, VC-12 or VC-11.

* * * * *